US007016696B2

(12) United States Patent
Vincent et al.

(10) Patent No.: US 7,016,696 B2
(45) Date of Patent: Mar. 21, 2006

(54) METHODS AND DEVICES FOR RADIO LINK ADAPTATION

(75) Inventors: Christophe Vincent, Gahard (FR); Ludovic Jeanne, Rennes (FR); Patrick Lopez, Livré s/Changeon (FR); Renaud Doré, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 64 days.

(21) Appl. No.: 10/491,871

(22) PCT Filed: Oct. 4, 2002

(86) PCT No.: PCT/EP02/11263

§ 371 (c)(1),
(2), (4) Date: Apr. 7, 2004

(87) PCT Pub. No.: WO03/032579

PCT Pub. Date: Apr. 17, 2003

(65) Prior Publication Data

US 2004/0242221 A1     Dec. 2, 2004

(30) Foreign Application Priority Data

Oct. 8, 2001    (EP) ................................ 01402592

(51) Int. Cl.
*H04B 7/00*    (2006.01)

(52) U.S. Cl. .................... 455/515; 455/552.1; 370/338

(58) Field of Classification Search .............. 455/513; 370/338, 332, 225
See application file for complete search history.

(56) References Cited

U.S. PATENT DOCUMENTS

| 5,987,062 A | * | 11/1999 | Engwer et al. ............ 375/225 |
| 6,580,700 B1 | * | 6/2003 | Pinard et al. ............. 370/332 |
| 6,580,704 B1 | * | 6/2003 | Wellig et al. ............. 370/338 |

FOREIGN PATENT DOCUMENTS

EP     452124     10/1991

OTHER PUBLICATIONS

ETSI: "TS 101 761-2 V1.2.1 Broadband Radio Access Networks (BRAN); HIPERLAN Type 2; Data Link Control (DLC) Layer; Part 2: Radio Link Control (RLC) sublayer" ETSI Standard, Apr. 2001, pp. 22-24.
H. Hart: "IP Sub-Networking Mini-Howto" Linux HOWTO, Aug. 30, 2001.
P. Narasimhan et al: "Design and implementation of radio access protocols in wireless ATM networks", Signals, Systems, and Electronics, 1998, ISSSE 98. 1998 URSI Int'l Symposium on Pisa, Italy Sep. 29, Oct. 2, 1998, pp. 20-28.
Copy of search report dated May 7, 2003.

* cited by examiner

*Primary Examiner*—Sonny Trinh
*Assistant Examiner*—Phuoc Doan
(74) *Attorney, Agent, or Firm*—Joseph S. Tripoli; Robert D. Shedd; Paul P. Kiel (57) ABSTRACT

The invention concerns methods for testing a connection either between a central controller of a communication network and a terminal of the network, or between two terminals of the network. In both cases, a terminal sends test pattern data which is to be echoed back by another device over the connection to be tested. In certain circumstances, a terminal may register twice with the central controller, in order to be able to establish the required test connection without disturbing existing connections. The invention also concerns devices for implementing the methods. The invention can be used in a Hiperlan 2 network.

9 Claims, 6 Drawing Sheets

METHODS AND DEVICES FOR RADIO LINK ADAPTATION

This application claims the benefit, under 35 U.S.C. § 365 of International Application PCT/EP02/11263, filed Oct. 4, 2002, which was published in accordance with PCT Article 21(2) on Apr. 17, 2003 in English and which claims the benefit of European patent application No. 01402592.8, filed Oct. 8, 2001.

The invention concerns methods and devices for adapting transmission parameters of a radio link. It can be used in, but is not limited to, the context of a Hiperlan 2 network.

In a wireless network, two devices communicating over a radio link may be required to dynamically configure their transmission parameters. Such parameters may include, among other parameters:

Physical mode (e.g. modulation and error correction).

Antenna sector or elements in case of multi-sectored antenna, both at the transmitter in order to transmit the greatest power into the right direction and at the receiver in order to obtain the greatest gain.

Selecting the proper parameters has a direct influence on the robustness and performance of a radio link. It is desirable to use the strictly necessary amount of resources, e.g. power and bandwidth.

Adjustment of connection parameters should not disturb existing operational connections, in particular connections conveying video streams. Moreover, channel characteristics may change with time and require readjustment of the transmission connection parameters at unpredictable moments, and evaluation of these characteristics should be possible at any time.

The invention concerns a method for radio link adaptation in a centralized communication network comprising a central controller and at least one terminal associated with the central controller, characterized by the steps of:

(a) initiating a first connection from the terminal to the central controller;

(b) initiating a second connection from the central controller to the terminal;

(c) having the terminal determine a set of connection parameter values to be used over this second connection;

(d) transmitting, by the terminal, test pattern data to the central controller over the first connection;

(e) sending the test pattern data from the central controller to the terminal over the second connection applying the set of connection parameters;

(f) have the terminal evaluate a quality criterion of the second connection based on the test pattern data received by the terminal.

By having the central controller mirror a test pattern back to a terminal, the latter can verify the quality of a connection, and eventually modify the parameters of an existing or future connection.

According to an embodiment of the invention, the method further comprises the step of having the terminal carry out two associations with the central controller for obtaining two distinct medium access control identifiers, wherein a first medium access control identifier is reserved for purposes other than connection evaluation, and a second medium access control identifier is reserved for connection evaluation.

In certain circumstances, it may be desirable to enable a single terminal to associate twice with the central controller, in order to avoid disturbing existing connections when carrying out connection tests.

The invention also concerns a method for radio link adaptation in a centralized communication network comprising a central controller and a first terminal and a second terminal associated with the central controller, characterized by the steps of:

(a) having the first terminal associate a second time with the central controller in order to obtain a second medium access control identifier;

(b) having the first terminal establish a first direct mode connection to the second terminal using the second medium access control identifier;

(c) having the first terminal initiate a second direct mode connection from the second terminal;

(d) having the first terminal determine a set of connection parameter values to be used over this second connection;

(e) having the first terminal send to the test pattern data to the second terminal over the first connection;

(f) sending the test pattern data from the second terminal to the first terminal over the second connection applying the set of connection parameters;

(g) having the first terminal evaluate a quality criterion of the second connection based on the test pattern data received by the first terminal.

Another object of the invention is a terminal in a centralized communication network comprising a central controller with which the terminal associates, characterized in that it comprises means for establishing a first connection to the central controller to send test pattern data to the central controller, and for establishing a second connection from the central controller for receiving said test pattern data from said controller and evaluating said second connection for a given set of transmission parameters.

Another object of the invention is a terminal in a centralized communication network comprising a central controller with which the terminal associates and a target device, characterized in that the terminal comprises means for obtaining at least two medium access control identifiers from the central controller, and means for establishing a first connection from the terminal to the target device to send test pattern data to the target device, and for establishing a second connection from the target device to the terminal for receiving said test pattern data from said target device and evaluating said second connection for a given set of transmission parameters.

Other characteristics and advantages of the invention will appear through the description of an embodiment of the invention, explained with the help of the enclosed figures, among which.

The present embodiment is based on a Broadband Radio Access Network (BRAN) HIPERLAN Type 2 network. This network is being specified by the European Telecommunications Standards Institute. Hiperlan 2 is based on Time Division duplex (TDD) and dynamic Time Division Multiple Access (TDMA). In Hiperlan 2, Mobile Terminals (MTs) associate (i.e. register) with a central device called Access Point (AP) in order to be able to communicate with the AP or with other Mobile Terminals. The Access Point is also referred to as Central Controller in some instances. During association, the Access Point attributes a Medium Access Control Identifier (MAC ID) to the Mobile Terminal. This identifier is unique within the Access Point's network at a given time. When the Mobile Terminal wishes to set up a connection, it sends a corresponding request to the Access Point, which responds by sending a connection identifier (DLCC Id for Data Link Control Connection identifier). There may be several connections set up in parallel by a Mobile Terminal.

Nodes, be it Mobile Terminals or Access Points may comprise multi-sectored antennas with up to eight elements.

According to a first HIPERLAN 2 transmission mode, called Centralized Mode (CM), all data, be it control data or payload data, transits through the Access Point, even if the data is to be exchanged between Mobile Terminals which could otherwise communicate directly. According to a second HIPERLAN 2 transmission mode, called Direct Mode (DM), Mobile Terminals associated with a same Access Point exchange data without passing through this Access Point, although the exchange remains under its control.

A first embodiment of the invention will be described in reference to FIGS. 1 and 2.

Figure 1:
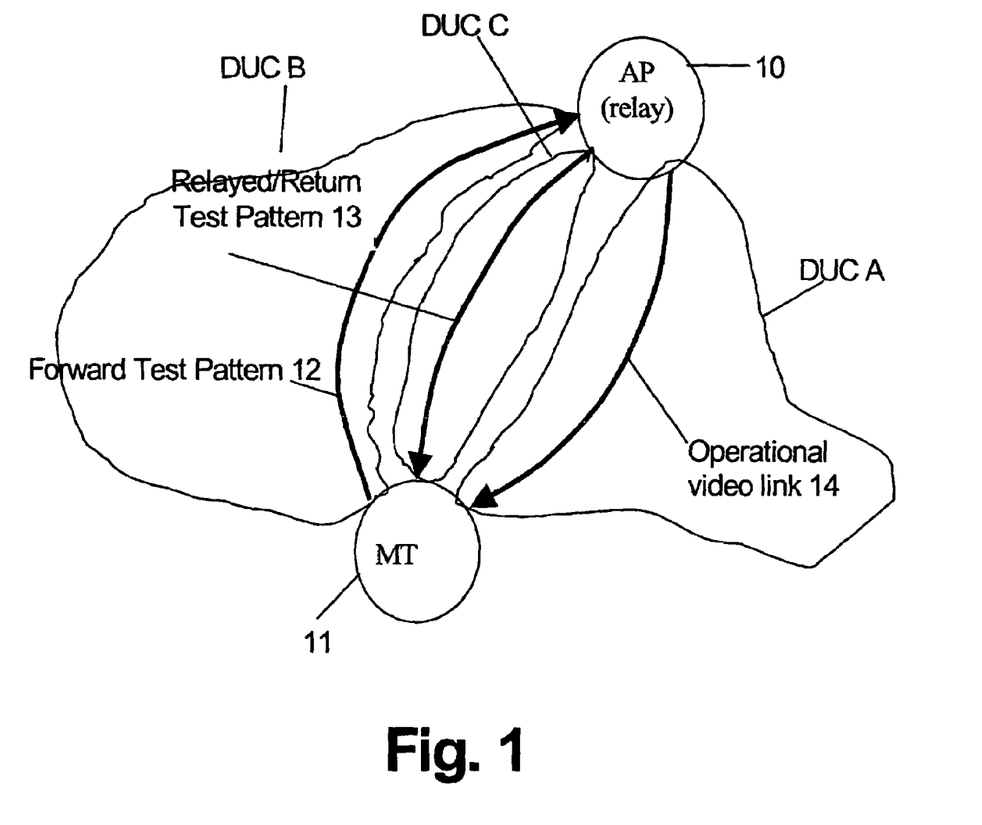
FIG. 1 is a schematic diagram of the connections in a network comprising an Access Point and a Mobile Terminal, according to a first embodiment of the invention.

FIG. 1 is a diagram of a Hiperlan 2 network comprising an Access Point 10 and a Mobile Terminal 11. Of course, other Mobile Terminals may already be associated, but are not shown in FIG. 1. The Access Point is sending a video stream to the Mobile Terminal 11 through a connection DUC A, having given connection parameter values. The connection identifier DLCC Id has for example a value of 10.

The Mobile Terminal 11 decides to check whether an alternative connection would be more efficient, while maintaining the existing connection (note that this process could also be carried out when there is no preexisting connection).

According to the present embodiment, the Mobile Terminal opens a second connection (DUC B, with for example a DLCC Id of '5'). The Mobile Terminal then transmits predetermined test pattern data to the Access Point ('Test Pattern link 12' in FIG. 1). According to the present embodiment, the test pattern data is generated randomly. Preferably, the link parameters for this transmission from the Mobile Terminal to the Access point are chosen so as to render this transmission robust. According to the present embodiment, the physical mode corresponding to a BPSK modulation with a coding rate of ½ is chosen.

The Access Point returns this test data to the Mobile Terminal ('Relayed Test Pattern Link 13' in FIG. 1) through a DUC C. For this return transmission, the Mobile Terminal specifies given connection parameter values. The Mobile Terminal then evaluates a quality criterion to estimate the quality of the connection from the Access Point to itself, based on the received test pattern data. As an example the DLCC Id of this return connection is equal to 11.

According to the present embodiment, the connection quality parameter is signal power. According to a variant of the embodiment, the connection quality criterion is the packet error loss.

Preferably, this test data transmission from the Mobile Terminal to the Access Point and back to the Mobile Terminal is carried out several times, with different connection parameter sets specified by the Mobile Terminal. According to the present embodiment, the Mobile Terminal cycles through the different physical modes (i.e. combinations of modulation type and coding rate), in the order of robustness The Mobile Terminal evaluates the quality criterion for each set of parameter values. It then selects the set of parameters giving the best quality.

Preferably, the test pattern data transmission is designed in such a way as to use up a small quantity of bandwidth resources only.

It is also to be noted that the video stream connection is not influenced by the test pattern connections.

The Access Point is used as a neutral mirror device. It is simply a relay.

It is the responsibility of the Mobile Terminal to:

(a) Initiate with the Access Point the connections from itself to the Access Point and back to itself.

(b) Select the appropriate length of bit patterns to be sent and the physical mode (bit rate) and request the Access Point to set these parameters for the return path.

The optional step c below is to be carried out in a Hiperlan 2 network only if the Mobile Terminal has no other connections open than those for testing the connection quality, in order to avoid disruption of these other connections:

(c) Change its own antenna sector number.

Figure 2:
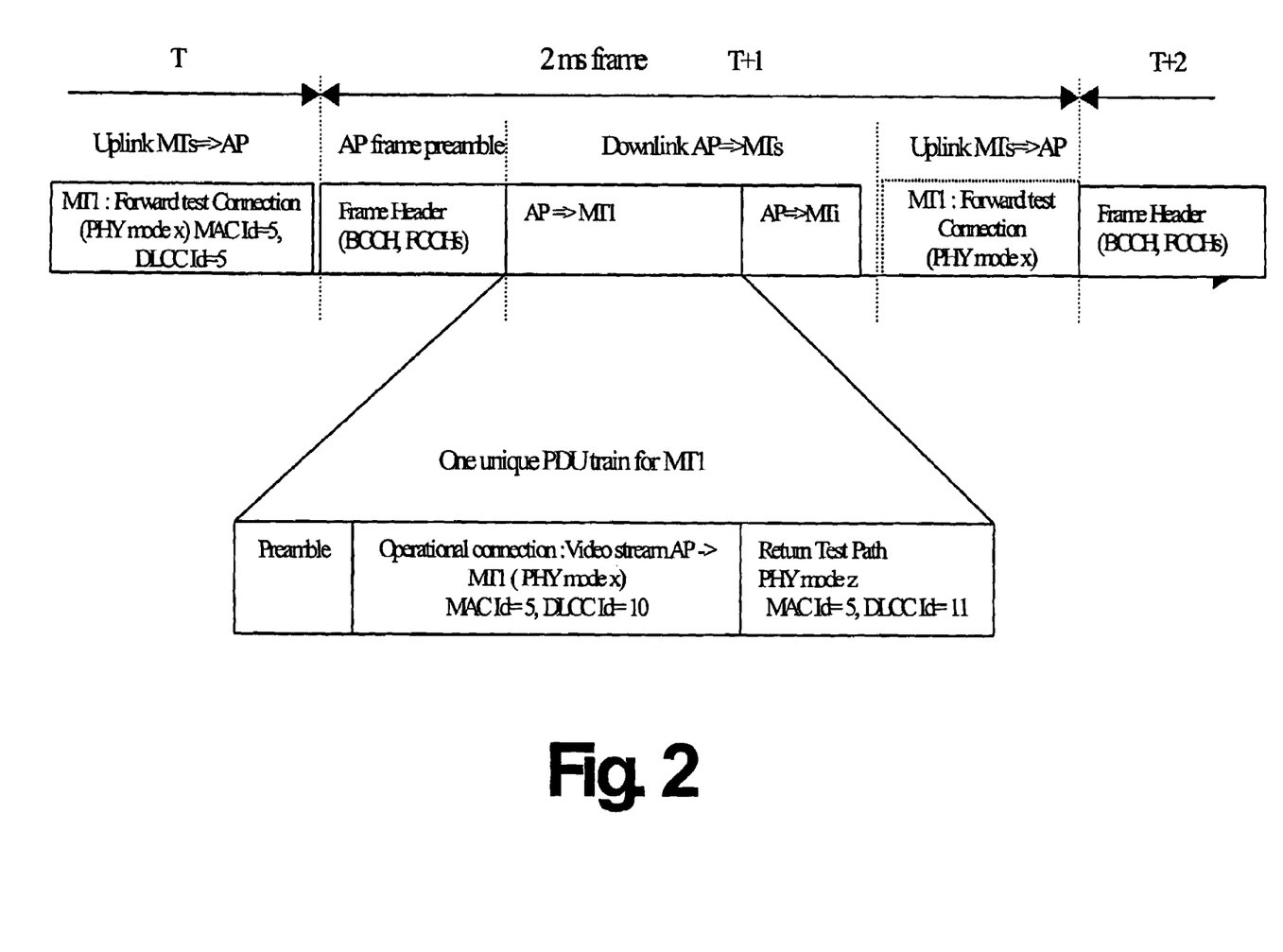
FIG. 2 is a schematic diagram of MAC frames according to the first embodiment of the invention, which includes using the Access Point as a relay device for relaying test pattern data.

FIG. 2 is a schematic diagram of MAC frames in which data relating to the above exchange has been highlighted. Of course, the MAC frames also contain other data than that illustrated in FIG. 2. The example applies to a one-sector antenna only.

The double connection MT-AP-MT is set up using the Access Point as a relay in Direct Mode. In a Direct Mode connection, a relay is used when there is no direct connectivity between the two Mobile Terminals between which the Direct Mode connection is to be established.

In the present case, the Mobile Terminal 11 sends a 'RLC_DM_RELAY_SETUP' message to the Access Point 10, specifying its own MAC Id as the peer MAC Id. The connection parameters for the connection from the Mobile Terminal and the Access Point on one hand and from the Access Point and the Mobile Terminal on the other hand are also specified in this message. The Access Point confirms the connection parameters requested on the connection from itself to the Mobile Terminal.

In what follows, it is supposed that the connections have already been set up.

In Frame T of FIG. 2, during the uplink phase, the Mobile Terminal 11 transmits test pattern data to the Access Point 10, using the robust physical mode mentioned previously (labeled 'PHY mode x' in FIG. 2) and requests this data to be sent back to itself. The Mobile Terminal 11 also requests a change of physical mode (i.e. the selected test mode) for the test connection by sending an appropriate RLC_DM_RELAY_MODIFY message to the Access Point.

The Access Point 10 confirms the physical mode for the test connection through appropriate information in an RLC_DM_RELAY_MODIFY_ACK message (presence of the DLCC_ID of the connection from the Access Point to the Mobile Terminal). A certain number of LCH packets have been granted to the three connections (forward test connection, return test connection, video link) of the Mobile Terminal. These packets, which are sent in one 'Protocol Data Unit' (PDU) train of contiguous packets for each Mobile Terminal within a given frame, are used to transmit both video data and the test pattern data to the Mobile Terminal during the downlink phase of the frame T+1. Other downlink phase resources may have been granted to other Mobile Terminals (referred to collectively as MTi in FIG. 2). During the uplink phase of the same frame, the Mobile Terminal 11 sends the next test pattern data (which may be the same as previously) to the Access Point 10, with the Mobile Terminal itself as the destination node, with a new set of connection parameter values.

Frame T+2 is similar to frame T+1, except for the variation in the connection parameters.

Once the Mobile Terminal has tested all sets of connection parameters, it decides on the best parameter set, and requests the Access Point to apply these parameters to the existing downlink video connection, using an RLC_DUC_MODIFY message.

A second embodiment of the invention will now be described.

The first embodiment enables the Mobile Terminal to test different sectors of its antenna, in case of a multi-sectored antenna. It does not enable the Mobile Terminal to specify an antenna sector on the side of the Access Point. Indeed, according to Hiperlan 2, the Access Point shall use the antenna sector it chose during association of the Mobile Terminal.

Moreover, in the first embodiment, all PDUs for a given Mobile Terminal are sent in a unique train of almost contiguous packets, whatever the logical connection these packets belong to. As a result, it is not possible for the Mobile Terminal 11 of the first embodiment to check the viability of different sectors of its reception antenna on this signal trunk (i.e. within a same PDU train corresponding to one or more connections), because a change of sector between two logical connections—e.g. the operational video connection and the test pattern connection of FIG. 1—may result in a drastic change of the received signal and consequently unlock the receiver's equalizer. The MAC frame was not designed with this possibility in mind.

According to a second embodiment of the invention, the Mobile Terminal 11 creates a specific association with the Access Point to test connection parameters. In the case of FIG. 1, the Mobile Terminal 11 associates a second time with the Access Point 10, since it is already associated. By doing so, the Mobile Terminal owns two different MAC IDs. The Access Point will not be aware of the fact that the same Mobile Terminal has registered more than once. In what follows, the two MAC IDs of Mobile Terminal 11 will be referred to as MT11 and MT11' respectively.

Figure 3:
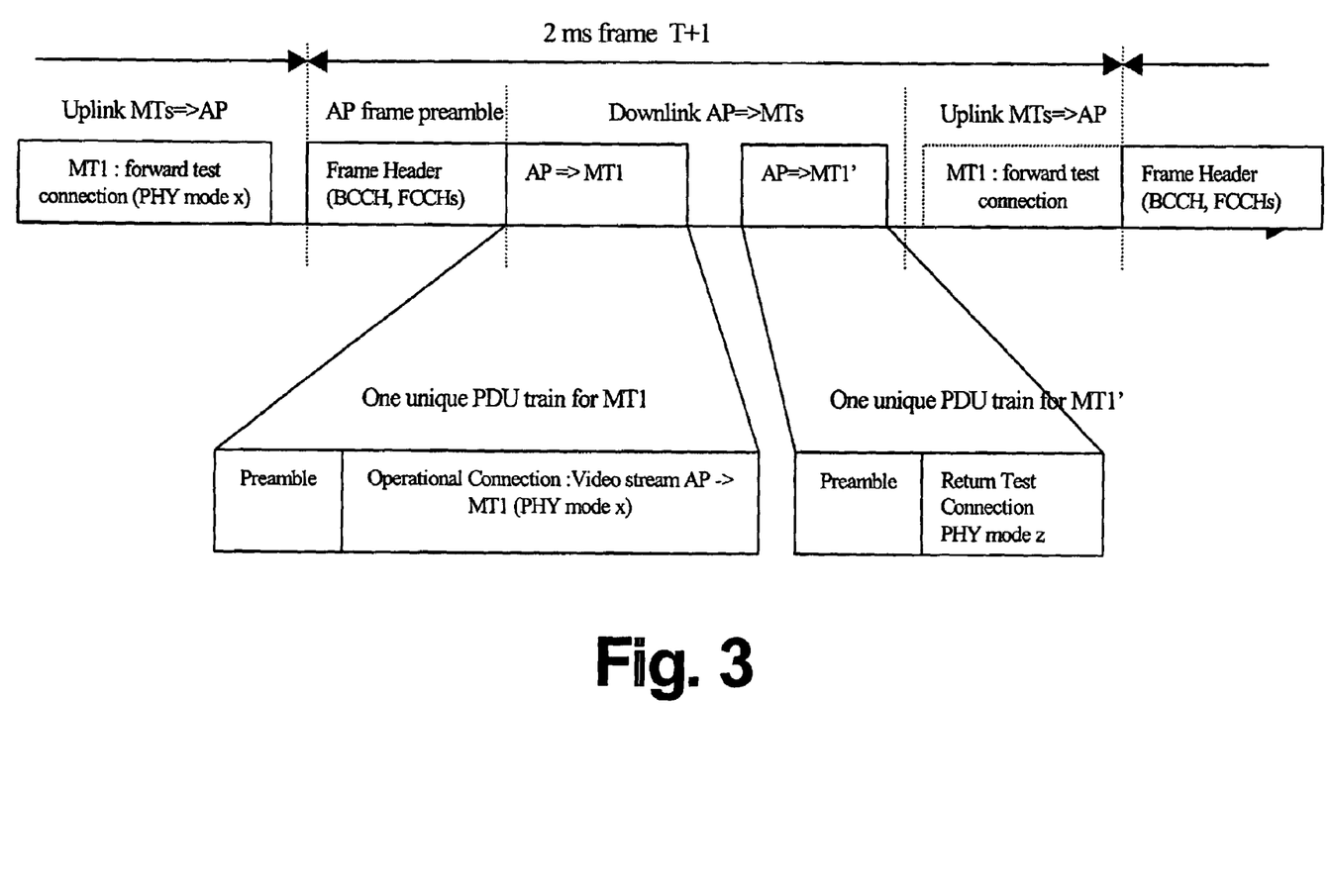
FIG. 3 is a schematic diagram of MAC frames according to a second embodiment of the invention, which includes multiplication of MAC IDs for a same terminal.

FIG. 3 represents MAC frames resulting from this duplication. As a result of the MAC ID duplication, the relayed test pattern data will be sent from the Access Point to the Mobile Terminal in a logical connection physically separate from the data of the video connection at least by a preamble. This preamble is required in order to be able to receive the payload data of a PDU train in unknown channel transfer conditions.

Moreover, the second association can be made with a different Access Point antenna sector than the first association, enabling testing of this additional parameter. The Mobile Terminal can specify the appropriate Access Point antenna sector.

Figure 6:
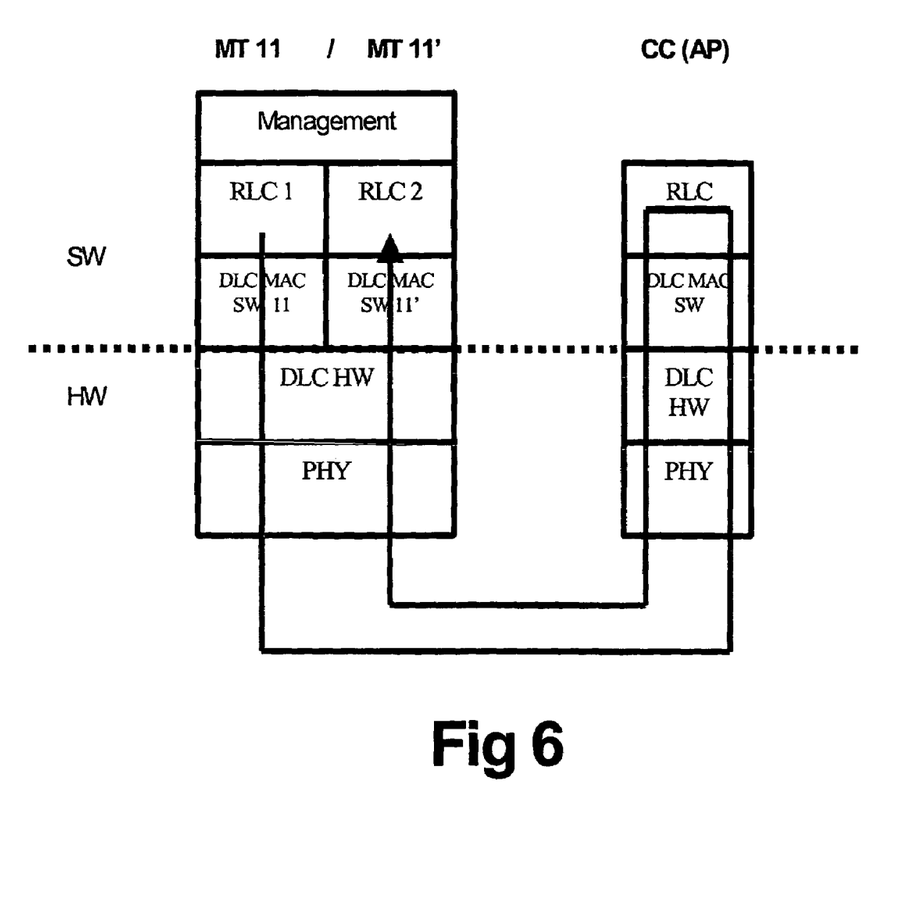
FIG. 6 is a schematic diagram of the software stacks in a Mobile Terminal and an Access Point according to the second and third embodiment of the invention.

FIG. 6 is a diagram of the software stacks in the Mobile Terminal 11 and in the Access Point 10. The RLC layers and DLC MAC layers of Mobile Terminal 11 are duplicated.

The first and the second embodiments of the invention concern the evaluation of the path from the Access Point to the Mobile Terminal.

A third embodiment of the invention and which will now be described, concerns the Direct Mode path evaluation or peer-to-peer link between two Mobile Terminals.

Figure 4:
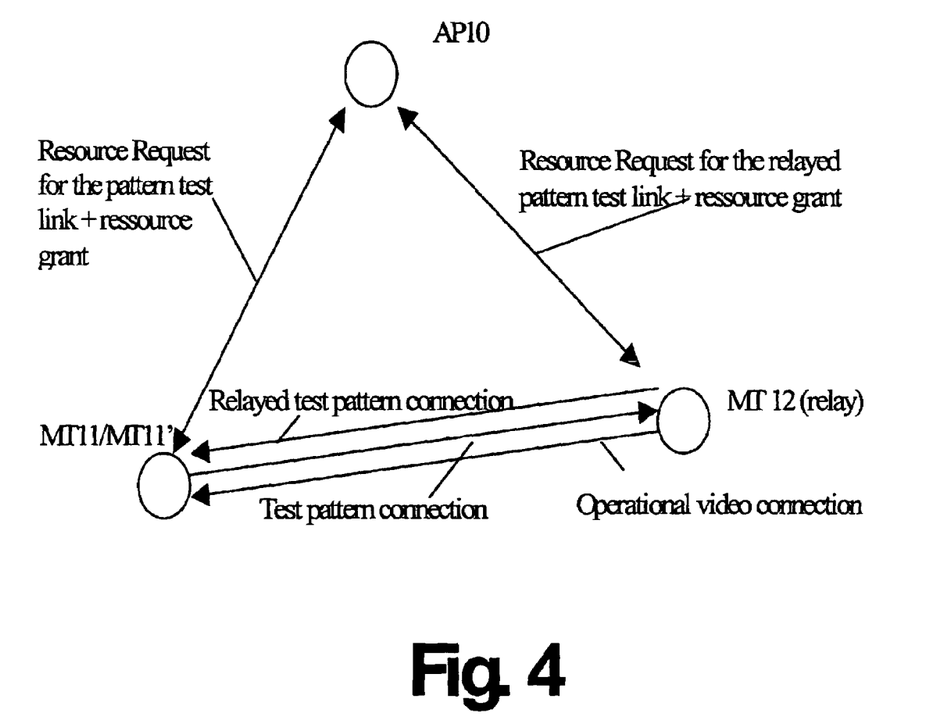
FIG. 4 is a schematic diagram of connections in a network comprising an Access Point and two terminals according to a third embodiment of the invention, for testing a connection of two terminals in direct mode.
Figure 5:
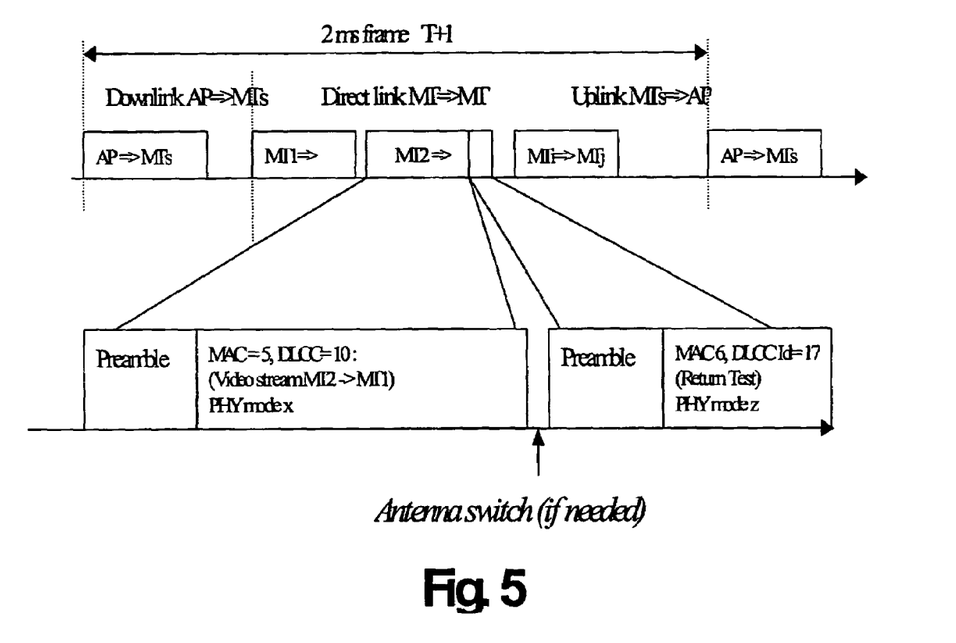
FIG. 5 is a schematic diagram of a MAC frame according to the third embodiment.

FIG. 4 is a diagram of the network of FIG. 1, to which an additional Mobile Terminal MT12 has been added. According to the example of FIG. 4, Mobile Terminal 12 (having a MAC ID 'MT12') is sending a video stream to Mobile Terminal 11, over a connection having a DLCC ID with a value of '10'. The Mobile Terminal 11 has a MAC ID of '5'.

The Mobile Terminal 11 decides to test for alternative connections from Mobile Terminal 12 to itself. The operation video connection is to remain intact. In order to be able to receive test pattern data in parallel with the existing link, the Mobile Terminal 11 carries out the following steps:

(a) Duplicated association, during which a new MAC ID is obtained. This MAC ID MT11' is equal to '6', as an example.

(b) The test software of Mobile Terminal 11 establishes a direct mode connection (Test Pattern Connection and Relayed Test Pattern Connection in FIG. 4) between itself and the Mobile Terminal 12, based on its MAC ID MT11'. This connection is established through an appropriate protocol carried out with the Access Point (RLC_DM_SETUP message). The Mobile Terminal 11 specifies the connection parameters for the connection from itself to the Mobile Terminal 12—e.g. BPSK at a coding rate of ½—as well as the parameters to be used on the return connection.

(c) The Mobile Terminal 11 sends test pattern data to the Mobile Terminal 12 using the robust transmission parameters previously defined.

(d) The Mobile Terminal 12 relays the test pattern data back to Mobile Terminal 11, using the parameters specified that connection.

(e) The Mobile Terminal 11 evaluates its quality criterion and repeats the steps (b) to (e) as often as necessary with different sets of parameters.

Similarly, Mobile Terminal 12 could test the connection from Mobile Terminal 11 to Mobile Terminal 12.

The software stack of Mobile Terminal 11 is the same as that indicated by FIG. 6 in relation with the second embodiment.

The current Hiperlan draft specifications do not allow a Mobile Terminal to act as a relay in the same way as an Access Point. It is proposed to include such a possibility for a Mobile Terminal at the level of the Radio Link Control layer, in a similar fashion as already existing for the Access Point.

As a variant of the third embodiment, it is proposed to include the relay function at the application level, e.g. through a proprietary application. In this case, it is not required to modify the current draft specifications, but any Mobile Terminal to have such function has then to implement this application.

Also, it is required to establish a protocol enabling the Mobile Terminal 11 to change the connection parameters (physical mode, transmitter antenna sector . . . ) on the relay connection from Mobile Terminal 12 back to Mobile Terminal 11. According to the present embodiment, this protocol is established at the application level in the Mobile Terminals. The Access Point does not require any special software, i.e. it suffices for it to conform to the Hiperlan 2 specifications.

According to a variant of all three embodiments, the Mobile Terminal 11 selects, for at least the return test pattern connection (and preferably also for the forward test pattern connection), a non acknowledge error control mode devoid of forward error correction. As already mentioned in relation with the first two embodiments, the physical mode used to transmit the test pattern data to the Mobile Terminal 12 is robust, in order to render the contribution of this transmission to the overall degradation negligible compared to that of the return path.

The invention claimed is:

1. Method for radio link adaptation in a centralized communication network comprising a central controller and at least one terminal associated with the central controller, comprising the steps of:
   (a) initiating a first connection from the terminal to the central controller;
   (b) initiating a second connection from the central controller to the terminal;
   (c) having the terminal determine a set of connection parameter values to be used over this second connection;
   (d) having the terminal transmit test pattern data to the central controller over the first connection;
   (e) sending the test pattern data from the central controller to the terminal over the second connection applying the set of connection parameters;
   (f) have the terminal evaluate the efficiency of the second connection based on the test pattern data received by the terminal; and
   (g) having the terminal carry out two associations with the central controller for obtaining two distinct medium access control identifiers, wherein a first medium access control identifier is reserved for purposes other than connection evaluation, and a second medium access control identifier is reserved for connection evaluation.

2. Method according to claim 1, wherein the quality criterion is evaluated for several sets of connection parameter values.

3. Method according to claim 2, further comprising the step of selecting a set of connection parameters corresponding to a highest quality and applying this set of connection parameters to an existing connection.

4. Method according to claim 1, wherein the connection parameters include the physical transmission mode.

5. Method according to claim 1, wherein the test pattern data sent from the terminal to the central controller is sent over the first connection with connection parameter values comprising a physical mode that reduce the transmission errors.

6. Method according to claim 1, where the second connection is set up using the second medium access control identifier.

7. Method according to claim 1, wherein the set connection parameters further includes the terminal's receiver antenna sector.

8. Method according to claim 1, wherein the second association includes the step of selecting a central controller antenna sector different from that used for the first association.

9. Method according to claim 1, wherein the communication network is a Hiperlan 2 network.

* * * * *